(12) United States Patent
Halabi et al.

(10) Patent No.: US 11,526,512 B1
(45) Date of Patent: Dec. 13, 2022

(54) REWRITING QUERIES (71) Applicant: Amazon Technologies, Inc., Seattle, WA (US)

(72) Inventors: Nissim Halabi, Ramat Gan (IL); Natali Arieli, Tel Aviv (IL); Sagi Bernstein, Herzliya (IL); Iftah Gamzu, Rishon Lezion (IL); Marina Haikin, Tel Aviv (IL); Yochai Zvik, Modiin (IL)

(73) Assignee: Amazon Technologies, Inc., Seattle, WA (US)

( * ) Notice: Subject to any disclaimer, the term of this patent is extended or adjusted under 35 U.S.C. 154(b) by 672 days.

(21) Appl. No.: 16/452,363

(22) Filed: Jun. 25, 2019

(51) Int. Cl.
G06F 16/2453 (2019.01)
G06F 16/2452 (2019.01)
G06K 9/62 (2022.01)
G10L 15/16 (2006.01)
G06N 20/00 (2019.01)
G10L 15/22 (2006.01)
G06F 40/289 (2020.01)

(52) U.S. Cl.
CPC .. G06F 16/24534 (2019.01); G06F 16/24522 (2019.01); G06F 40/289 (2020.01); G06K 9/6256 (2013.01); G06N 20/00 (2019.01); G10L 15/16 (2013.01); G10L 15/22 (2013.01)

(58) Field of Classification Search
None
See application file for complete search history.

(56) References Cited

U.S. PATENT DOCUMENTS

| 2011/0078718 | A1* | 3/2011 | Jakobi | H04H 60/63 725/14 |
| 2017/0300530 | A1* | 10/2017 | Tang | G06F 16/24578 |
| 2019/0392828 | A1* | 12/2019 | Byrne | G06F 16/243 |
| 2020/0273448 | A1* | 8/2020 | Min | G10L 15/16 |

* cited by examiner

Primary Examiner — Thu N Nguyen
(74) Attorney, Agent, or Firm — Knobbe Martens Olson & Bear LLP (57) ABSTRACT Systems and methods are described for mitigating errors introduced during processing of user input such as voice input. A query may be derived from processed user input. A performance predictor analyzes the query and uses historical data to predict whether the query will return relevant results if executed. If the query's predicted performance is below a threshold, a query rewriter may identify potential alternatives to the query from a library of "known good" queries. Different analyzers may be applied to identify different sets of alternatives, and machine learning models may be applied to rank the outputs of the analyzers. The best-matching alternatives from each analyzer may then be provided as inputs to a further machine learning model, which assesses the probability that each of the identified alternatives reflects the intent of the user. A most likely alternative may then be selected to execute in place of the original query.

25 Claims, 8 Drawing Sheets

REWRITING QUERIES

BACKGROUND

Generally described, computing devices can utilize a communication network, or a series of communication networks, to exchange information. In a common application, a computing device can request information from another computing device or devices via a communication network. For example, a personal computing device that accepts audio input can send unprocessed or pre-processed speech via a communication network to a server computing device or devices, which may process (or further process) the input to recognize words and commands. The processing of the words or commands can generate a result that can be communicated via the communication network to the same personal computing device or a different device.

In some environments, the processing of input to recognize words and commands may be inaccurate, ambiguous, or incomplete. For example, audio input may be accompanied by background noise that interferes with speech recognition, or words may be recognizable but could map to a number of different possible objects.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to processing voice inputs provided to a network service. More specifically, aspects of the present disclosure are directed to systems, methods, and computer-readable media related to determining whether processed, spoken-word input has been correctly parsed into a meaningful query. Illustratively, a user may interact with a networked service via an interface device configured to capture inputs from the user, including audible inputs. Such audio interface devices can include specifically configured devices, often referred to as "smart speakers," mobile computing devices, embedded devices, or other types of computing devices. Illustratively, the interface device may be configured to receive speech-based input from users and process the speech input locally to recognize words. In another example, the interface device may pass speech input to the networked service for processing, or may partially process the speech input before sending partially processed speech input to the networked service.

With reference now to an illustrative example, the speech input may correspond to a query regarding an item, such as a product or service. For example, the speech input may be a query such as "I'd like to buy a navy blue Brand X men's jacket in size XL" or "how much is the Brand Y laptop?" It will be understood that a "query" in this context may refer generally to any input that is eventually provided to a search engine to obtain a set of search results, and that such input need not be phrased as a question per se. The networked service may thus process the speech input to identify that it contains a query, and in some embodiments may identify a specific product or product type as being the subject of the query.

The networked service may thus parse user-provided speech input to determine that the input contains a query. The networked service may thus cause a search engine to execute the query and return search results, which the networked service may then process to generate suitable voice output as a response to the query. In general, search results presented via an audio interface are heavily biased toward the first result that is presented. Since the results are effectively being read aloud to the user, the user's ability to "skim" the results and determine that a third or fourth result in a list is relevant to the user's interests is limited. It is thus more important when presenting search results via an audio interface that the "top" (first) search result be relevant to the user's query.

However, the processing of free-form audio input into queries may lead to queries that are unlikely to have a relevant top result, or that in some aspects do not return any search results. Various errors may be introduced when parsing the user's audio input into words or identifying a specific product based on the words. These errors may result in a question that is nonsensical, contains erroneous words, or is otherwise unlikely to lead to the user obtaining the information sought. This in turn leads to inefficient use of resources as these resources are used to generate irrelevant or null search results.

To address these problems, a provider of a networked service may implement a query performance predictor and a query rewriting module in accordance with aspects of the present disclosure. As described in more detail below, a query performance predictor may identify queries that are unlikely to lead to relevant search results and are thus candidates for rewriting. A query rewriting module, in turn, may process the user input and associated metadata to identify potential alternative queries that are more likely to produce search results that accurately reflect of the user's intentions. The query performance predictor and query rewriting module may thus improve the performance of a networked service when processing user queries and providing search results.

Illustratively, a query performance predictor may predict, prior to execution of a search query, whether the query will return relevant results. In some embodiments, relevance may be measured in terms of user engagement with the results. For example, if the user is querying for information regarding an item the user wishes to purchase, query results may be considered relevant if the outcome of presenting them to the user is an item purchase. As a further example, query performance may be measured in terms of whether the query produces results at all. A query may generate a null response, meaning that no items were found that correspond to the terms in the query. Similarly, a query that produces overly broad results and does not identify any particular item may be evaluated as a low-performing query. In some embodiments, the query performance predictor may provide a numerical score, referred to herein as a "query performance prediction" or "QPP," that is representative of query performance. In other embodiments, the query performance predictor may indicate whether a given query satisfies or does not satisfy a performance threshold.

A query rewriting module may thus be used to generate an alternative query. Generally described, a query may be described as having been "rewritten" when all or part of the query is replaced by an alternative query. The alternative query may, in some embodiments, be selected from a library of previously submitted queries that have returned results, and may be selected based on an assessment of whether the results of a particular alternative query would be relevant to the user who submitted the original query. As described in more detail below, the query rewriting module may use various analyzers to parse the user voice input and associated metadata into other possible queries that may be more representative of the user's intentions. By doing so, the query rewriting module may mitigate or overcome various parsing or processing errors that may occur during the processing of the voice input, and may do so without necessarily identifying the specific error that occurred during voice input processing. For example, the query rewriting module may identify an alternative query that is phonetically similar to the original query but is much more likely to return relevant results. The availability of the alternative query and the fact that it produces better results may indicate that an error occurred when processing the user's voice input into phonemes and words, and that the actual intent of the user was to ask the alternative query. However, the query rewriting module can identify the sound-alike alternative query without reprocessing the audio input or identifying the particular error that occurred, and may thus improve the system's perceived speech recognition capabilities without requiring direct improvements to the speech parser.

It will thus be understood that the query performance predictor and query rewriting module described herein address a technical problem that specifically arises in the realm of computer networks, and in particular addresses a problem that arises in the realm of processing inputs that may be parsed erroneously, such as speech input. It will further be understood that the technical problem described herein is not analogous to any pre-Internet practice, and that the query performance predictor and query rewriting module improve the performance of a networked service by reducing the usage of computing resources on the processing of misunderstood input. The provider of a networked service may thus make more effective use of resources and provide services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosures herein described.

Figure 1:
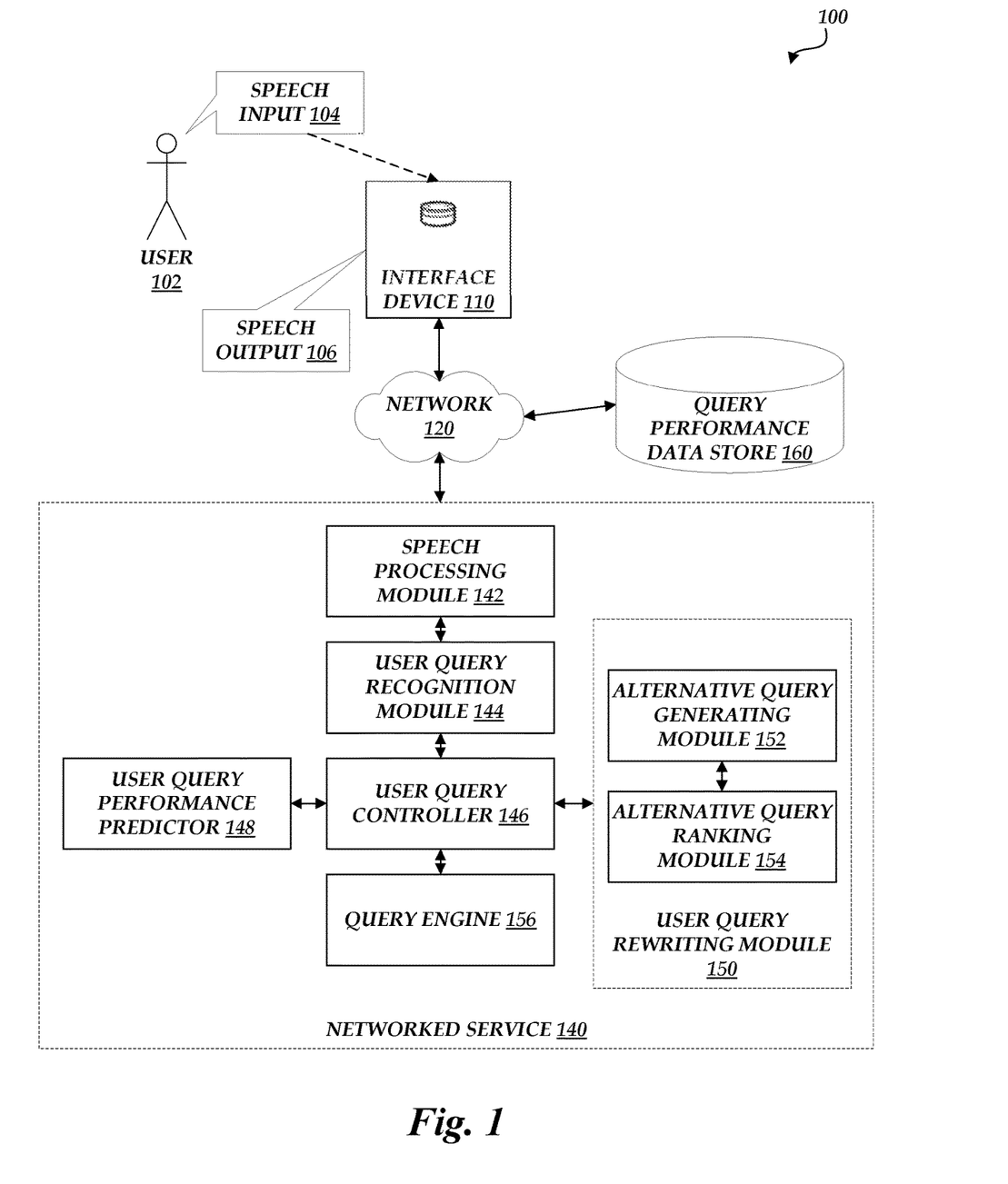
FIG. 1 is a block diagram depicting an illustrative environment in which a query performance predictor and a query rewriting module validate voice input in accordance with aspects of the present disclosure.

FIG. 1 is a block diagram of an illustrative operating environment 100 in which an audio interface device 110 captures speech input 104 from a user 102 and communicates with a networked service 140 and a query performance data store 160 via a network 120. It will be understood that the operating environment 100 may include more (or fewer) elements than those shown in FIG. 1. It is not necessary, however, that all of these elements be shown in order to provide an enabling disclosure.

The audio interface device 110 may illustratively be any computing device that captures speech input 104 in accordance with aspects of the present disclosure. Examples of an audio interface device 110 include mobile computing devices, wearable computing devices, desktop computing devices, laptop computing devices, tablets, "smart" speakers, televisions, e-book readers, gaming consoles, or other devices that implement a speech-based user interface. In some embodiments, the audio interface device 110 may be implemented as a component of another device, such as a "smart" home appliance or Internet of Things ("IoT") device. In some embodiments, the audio interface 110 may generate speech output 106, which may in turn be heard by the user 102.

The audio interface device 110 may communicate with other devices via a network 120. The network 120 may illustratively be any wired or wireless network, or combination thereof. In addition, the network 120 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long Term Evolution (LTE) network, or some other type of wireless network. The network 120 may use protocols and components for communicating via the Internet or any of the other aforementioned types of networks.

The audio interface device 110 may communicate with a networked service 140, which is described in more detail with reference to FIG. 5 below. In the illustrated embodiment, the networked service 140 includes a speech processing module 142, a user query recognition module 144, a user query controller 146, a user query performance predictor 148, a user query rewriting module 150 (which, in turn, includes an alternate query generating module 152 and an alternate query ranking module 154), and a query engine 156, which implement aspects of the present disclosure as described in more detail below. In some embodiments, various components of the networked service 140 may communicate with each other via the network 120 or another network. Additionally, in some embodiments, components that are depicted in FIG. 1 as being part of the networked service 140 may be implemented as components of the audio interface device 110 or another computing device. For example, all or part of the speech processing module 142 or the user query recognition module 144 may be implemented within the audio interface device 110.

The operating environment 100 further includes a query performance data store 160. The query performance data store 160 may illustratively be any non-transient computer-readable data store including magnetic media, optical media, solid state devices, flash memories, EEPROMs, or other storage media. In various embodiments, the query performance data store 160 may be implemented as a database, a database server, a component of another server or service, or may include or be embodied in a data storage web service.

In some embodiments, all or part of the query performance data store 160 may be implemented by or as a component of the networked service 140.

Figure 2A:
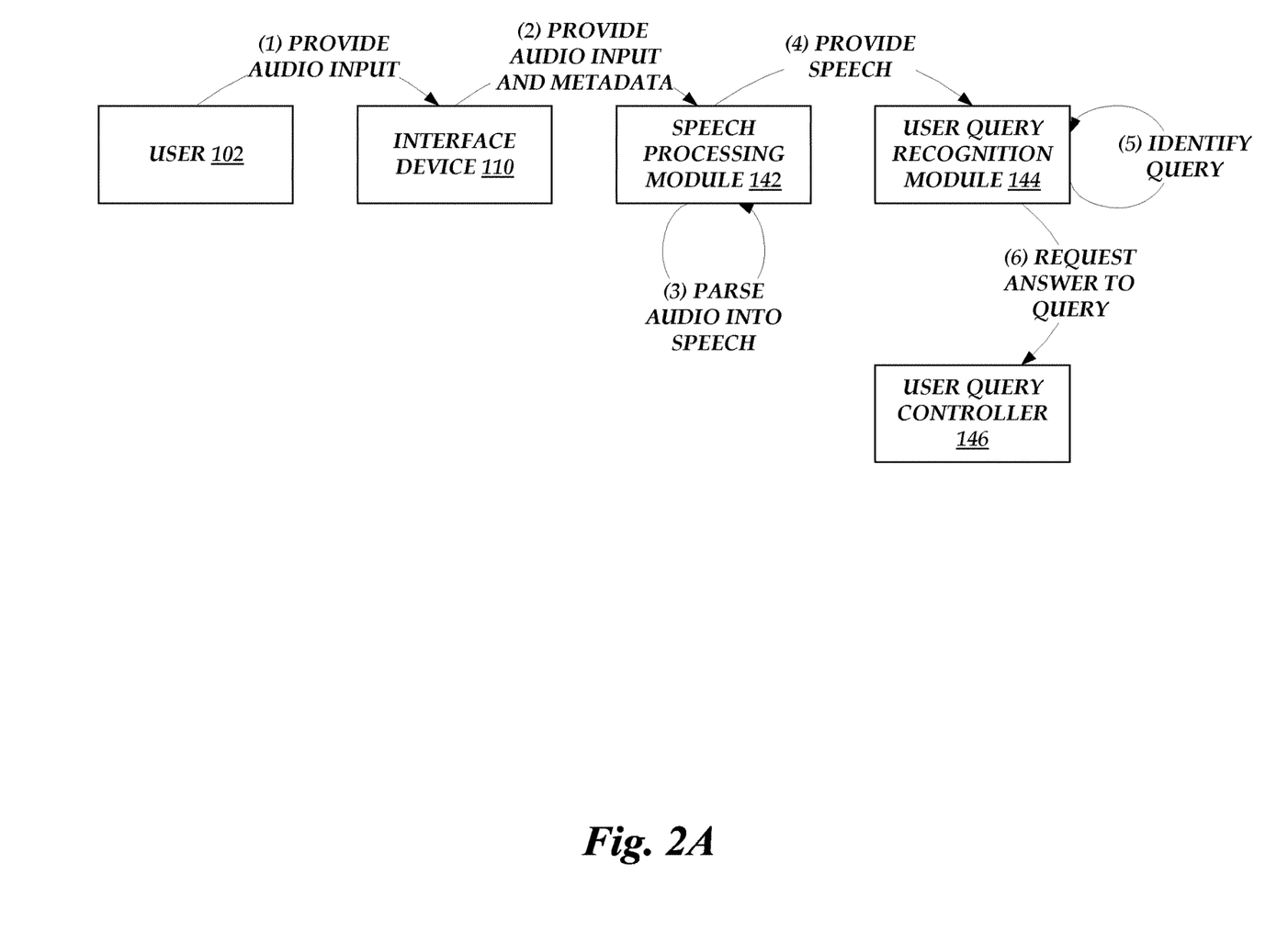
FIGS. 2A, 2B, 2C, and 2D are flow diagrams depicting illustrative interactions for using a query performance predictor and a query rewriting module to validate voice input in accordance with aspects of the present disclosure.

FIGS. 2A, 2B, 2C, and 2D depict example interactions for validating the processing of speech input in accordance with aspects of the present disclosure. With reference now to FIG. 2A, at (1), a user 102 may provide audio input to an audio interface device 110. The audio input may illustratively contain speech, and the speech may correspond to a query. Illustratively, the query may be with regard to a product, service, or other item made available by an operator of the networked service. At (2), the audio interface device 110 provides the audio input and associated metadata to the speech processing module 142, which at (3) parses the audio to identify speech. The speech processing module 142 may use techniques generally understood in the art to parse the audio and recognize speech, and these techniques may generally have varying degrees of accuracy. In some embodiments, the speech processing module 142 may accurately parse the audio into speech, but the accurately parsed speech may be ambiguous, illogical, or malformed. For example, the user 102 may begin speaking a query and then be interrupted, and the audio interface device 110 may capture an incomplete query followed by part of a conversation between the user 102 and a third party. As a further example, the user 102 may ask a question about an item without providing sufficient information to identify the particular item in question.

At (4), the speech processing module 142 may provide the processed speech to a user query recognition module 144, which at (5) may determine that the speech represents a user query. The user query recognition module 144 may therefore, at (6), request that the user query controller 146 provide an answer to the identified query. In some embodiments, the user query may be further processed to identify, e.g., a particular item or category of items that is the subject of the query. For example, the query "I need a left-handed pair of scissors" may be processed to identify a "scissors" product category and a "left-handed scissors" subcategory. In further embodiments, a product identifier (e.g., a UPC code or other identifier) may be included in the request.

Figure 2B:
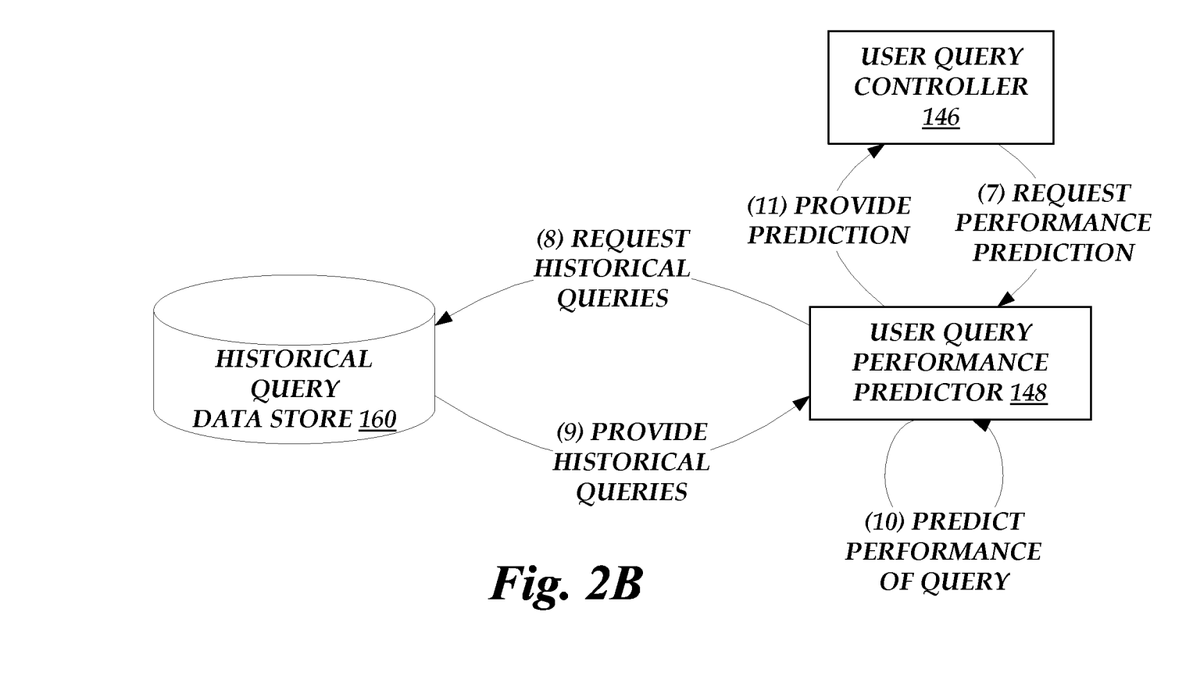

Turning now to FIG. 2B, at (7), the user query controller 146 may request that the user query performance predictor 148 predict the performance of the identified query. As described in more detail below, the user query performance predictor 148 may predict the performance of the identified query in terms of whether the query is likely to produce search results that are relevant and responsive to the query. For example, the audio input may be processed into the words "I'd like an audiobook of the most popular novel by marked train." The user query performance predictor 148 may, at (8), request information regarding historical queries for books by or about "marked train" from the query performance data store 160, and at (9) the query performance data store 160 may provide the requested query data. The query data may indicate, for example, that past queries about "marked train" have produced few or no search results, or that users who query for "marked train" tend to immediately make another query rather than interacting with the provided search results. In some embodiments, the query data may include information regarding subsequent conversions. For example, the query data may indicate that few or none of the "marked train" search results were subsequently purchased by the user making the query. At (10), the user query performance predictor 148 predicts the performance of the query based on the obtained historical query data.

At (11), the user query performance predictor 148 provides the prediction to the user query controller 146. In some embodiments, the user query performance predictor 148 may provide a numerical score or other indicator of the performance prediction. For example, the user query performance predictor 148 may return one or more values indicating the quality of search results expected. In other embodiments, the user query performance predictor 148 may compare the query performance prediction to a threshold, and may indicate to the user query controller 146 whether the query is above or below the threshold rather than providing the prediction itself. In further embodiments, the user query controller 146 may determine that the query performance prediction does not satisfy a threshold, and may thus determine that an alternate query should be generated.

Figure 2C:
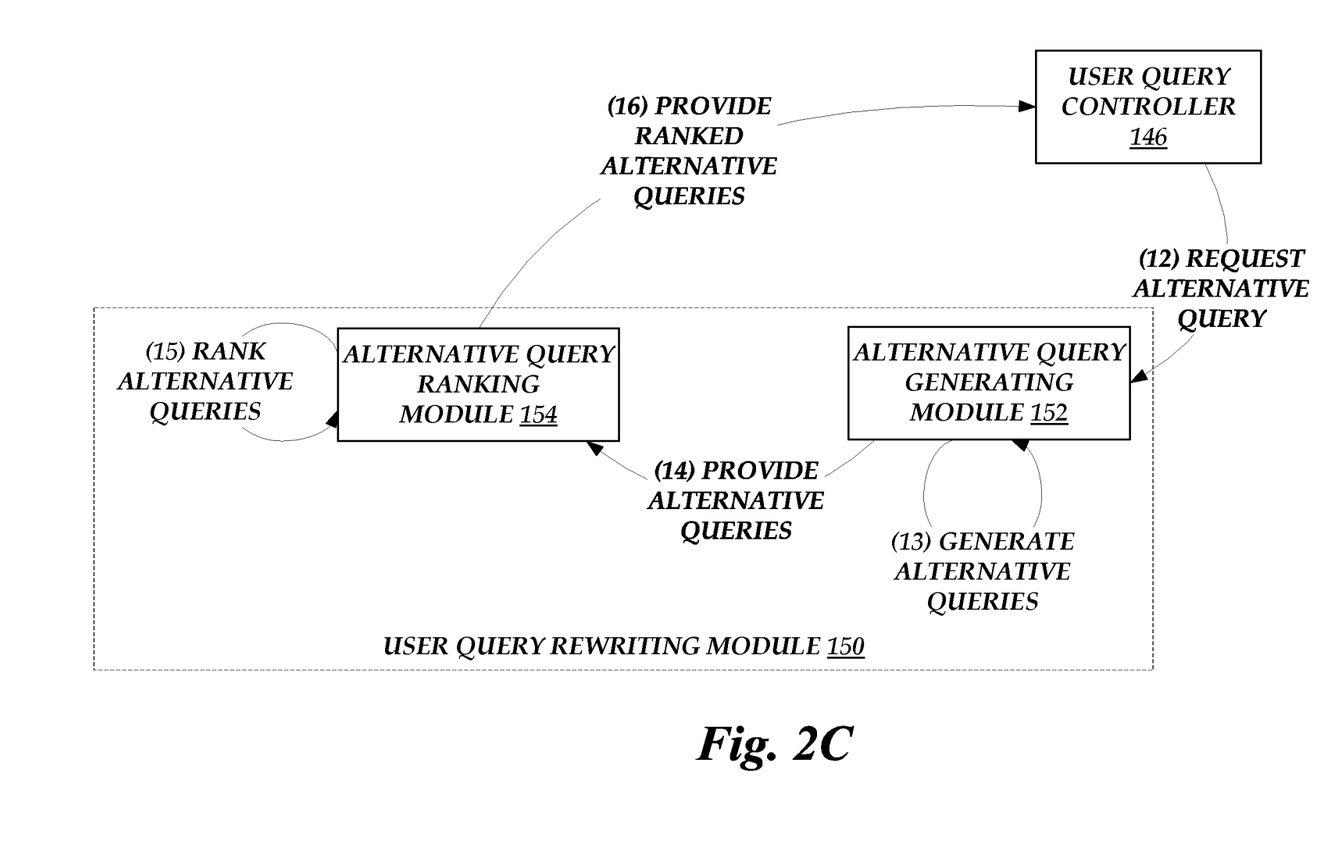

With reference now to FIG. 2C, at (12), the user query controller 146 may request that the alternative query generating module 152 of the user query rewriting module 150 generate an alternative query. Illustratively, the user query controller 146 may provide information regarding the original user query to the alternative query generating module 152, including information such as raw or processed voice input and associated metadata. At (13), the alternative query generating module 152 may generate alternative queries. As described in more detail below, the alternative query generating module 152 may apply one or more analyzers to the input data from which the user query was derived to determine potential alternative queries that could be derived from the data. For example, the alternative query generating module 152 may re-parse the phoneme data from which the query "I'd like an audiobook of the most popular novel by marked train" was derived, and may derive the alternative query "I'd like an audiobook of the most popular novel by Mark Twain." As further examples, the alternate query generating module 152 may analyze the text of the query to identify the four-character string "mark" as potentially forming part of an author's name, or may derive other queries for author names that rhyme with or otherwise sound similar to "marked train."

At (14), the alternative query generating module 152 may provide alternative queries to the alternative query ranking module 154, which at (15) may rank the alternative queries. As described in more detail below, the alternative query generating module 152 may apply machine learning models trained on the outputs of particular analyzers to determine a confidence score that a particular alternative query will return relevant results. At (16), the alternative query ranking module 154 provides ranked alternative queries to the user query controller 146. In some embodiments, the alternative query ranking module 154 may provide the ranked alternative queries to the alternative query generating module 152, which may then provide the ranked alternative queries to the user query controller 146.

Figure 2D:
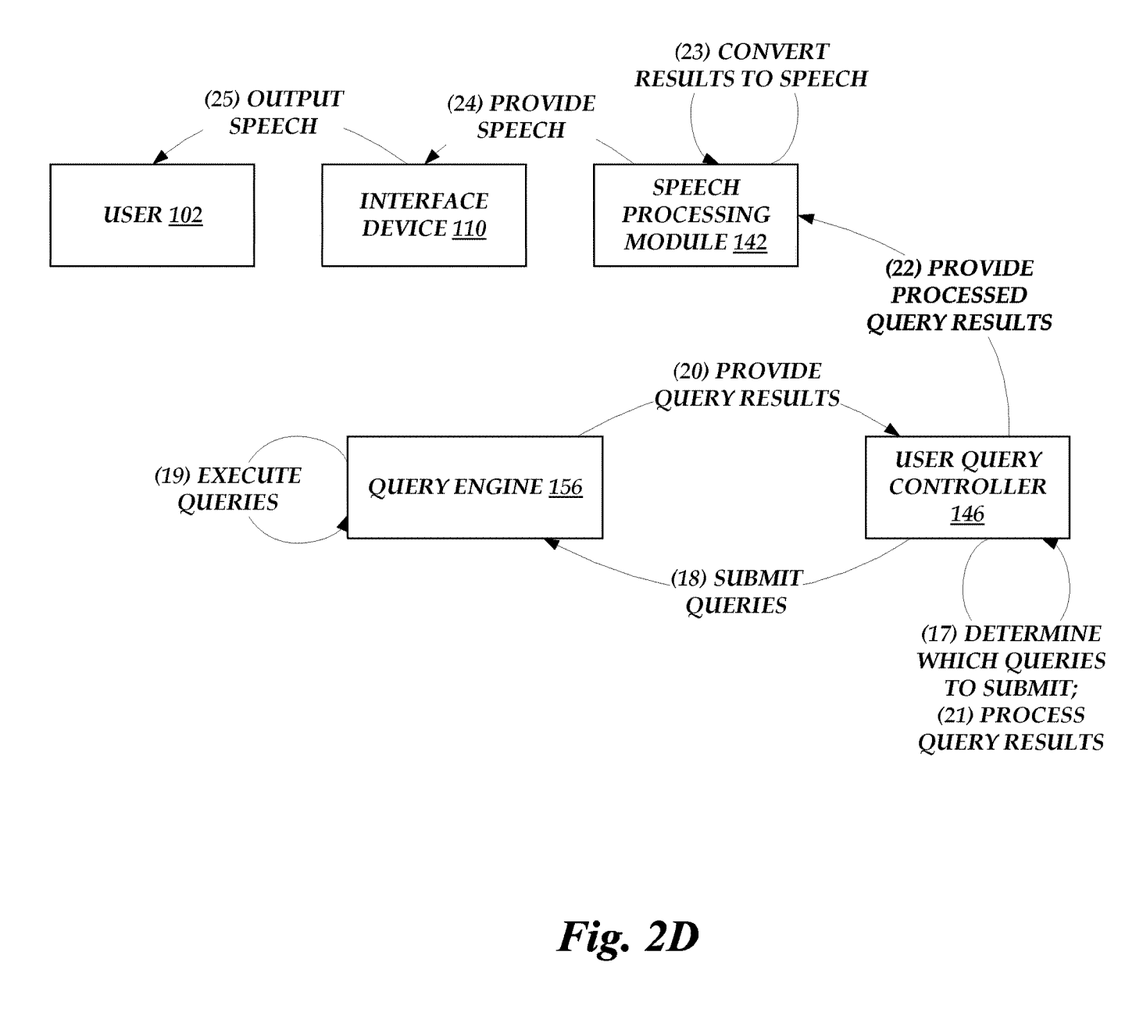

Turning now to FIG. 2D, at (17), the user query controller 146 determines which of the queries (including, potentially, the original user query) to submit to the query engine 156. In some embodiments, as described in more detail below, the user query controller 146 may determine that none of the suggested alternate queries are sufficiently likely to produce relevant search results, and may therefore determine to submit the original query to the query engine 156. In other embodiments, the user query controller 146 may identify an alternate query that has been identified as most likely to return relevant results, or may determine that both the original query and the alternate query should be submitted.

At (18), the user query controller 146 submits the query or queries to the query engine 156, which executes them at (19) and provides search results at (20). At (21), the user query controller 146 processes the query results. Illustratively, the user query controller 146 may identify a "top" result to provide as speech output to the user 102 based on factors such as a determined relevance of the returned search results. In some embodiments, as described above, the relevance of the top result may be particularly useful when presenting the results via an audio interface. As such, the user query controller 146 may focus its efforts on providing a relevant top result, even if other search results from the same query are determined to be less relevant. In some embodiments, the user query controller 146 may assess the relevance of results from multiple queries and produce a blended result.

At (22), the user query controller 146 provides the processed query results to the speech processing module 142. Thereafter, at (23), the speech processing module 142 converts the processed query results into speech suitable for output via the interface device 110, and at (24) provides the speech for output. The interface device 110 then, at (25), provides the search results to the user 102 in the form of speech output.

It will be understood that FIGS. 2A, 2B, 2C, and 2D are provided for purposes of example, and that many variations on the interactions depicted in these examples are within the scope of the present disclosure. For example, the interactions depicted in FIG. 2B may be omitted or carried out separately from the other depicted interactions. (That is, the query performance prediction may be performed independently of the determinations of alternative queries, and vice versa.) As a further example, the interactions at (15) may be omitted or combined with the interaction at (17) such that the user query controller 146 ranks the output of the individual analyzers. FIGS. 2A, 2B, 2C, and 2D are thus understood to be illustrative and not limiting.

Figure 3:
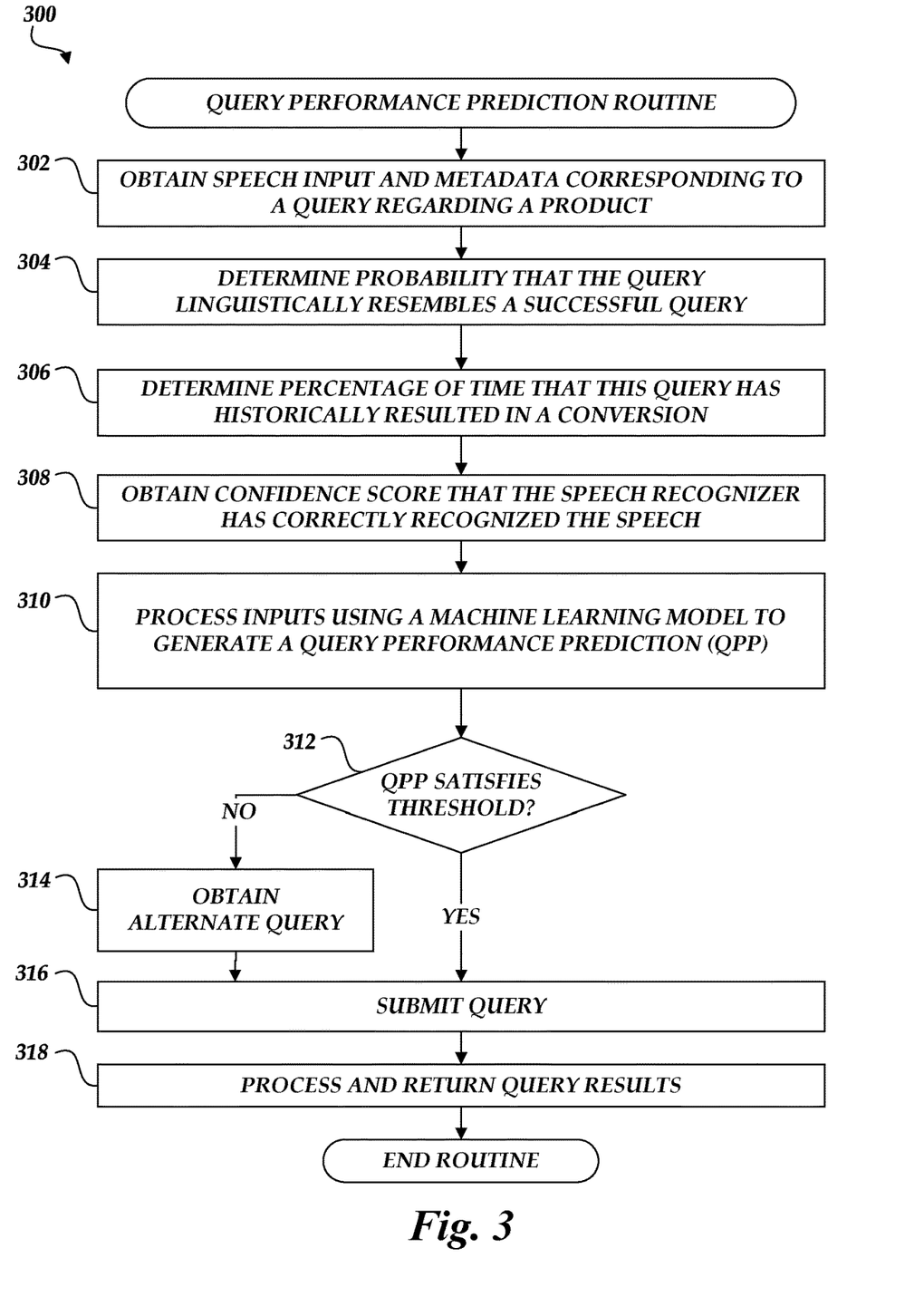
FIG. 3 is a flowchart depicting an illustrative routine for predicting query performance in accordance with aspects of the present disclosure.

FIG. 3 is a flow chart depicting an illustrative routine 300 for generating and acting upon query performance predictions in accordance with aspects of the present disclosure. The routine 300 may be carried out, for example, by the user query performance predictor 148 depicted in FIG. 1. The routine 300 begins at block 302, where speech input and metadata corresponding to a query may be obtained. As described in more detail above, speech input from a user may be parsed into phonemes, spoken words, written words, product or item identifiers, or other processed voice input, and may be accompanied by metadata such as speech recognizer confidence levels, product identifiers, product types, and the like.

At block 304, in some embodiments, a probability may be determined that the query linguistically resembles a successful query. Illustratively, the query may be evaluated using a language model or models trained on "good" queries (e.g., queries that led to a positive interaction with the search results, such as the user purchasing an item). The query may illustratively be analyzed as a sentence containing m words, and an n-gram language model may be used to estimate the probability of observing the sentence in the language as follows:

$$P(w_1, \ldots, w_m) = \prod_{i=1}^{m} P(w_i | w_1, \ldots, w_{i-1}) \approx \prod_{i=1}^{m} P(w_i | w_{i-(n-1)}, \ldots, w_{i-1})$$

In some embodiments, language models trained on "bad" or "null" queries (e.g., queries that returned irrelevant search results or no search results) may further be used to estimate probabilities that the query linguistically resembles a bad query or a null query.

At block 306, in some embodiments, historical executions of the user query may be obtained, and a percentage may be determined indicating how often execution of this query results in a positive user interaction. For example, the determination may be that the user query results in a purchase of the item that is presented as the top search result 27% of the time. As a further example, the determination may be that at least one of the top three search results is purchased 39% of the time. In some embodiments, absolute numbers of executions, positive user interactions, or negative user interactions for the user query may be obtained, and the determination may be that these numbers satisfy various criteria. For example, the determination may be that the user query has resulted in a positive user interaction at least a threshold number of times, or that the query has been executed a threshold number of times. At block 308, in some embodiments, a confidence score may be obtained (e.g., from the metadata) that the speech recognizer has correctly recognized the words in the query. For example, the speech recognizer chose between a number of plausible interpretations of the audio data, and the confidence score may indicate a likelihood that the speech recognizer's chosen interpretation is the correct one. In some embodiments, the speech recognizer's confidence score may be expressed on a per-word or per-phoneme basis, and the routine 300 may analyze the individual confidence scores relative to how significant the indicated word or phoneme may be to the user query.

It will be understood that the interactions at blocks 304, 306, and 308 are provided for purposes of example, and that many other analyses of the speech input and metadata are within the scope of the present disclosure. For example, textual properties of the query, such as the number of characters or words in the query, may be obtained and analyzed relative to historical queries or in absolute terms (e.g., longer queries may be treated as more likely to be "good" queries). As a further example, a confidence score that a particular item is associated with the query (e.g., a specific product identifier), or that a product type or category has been correctly identified, may be obtained from a product recognition service. As a still further example, a confidence level that the user uttered a query may be obtained from the user query recognition module. In some embodiments, historical executions of the user query may be analyzed to identify trends or patterns, such as the user query being executed at a particular time or day, day of the week, or more frequently as a particular date approaches (or less frequently after the date passes).

At block 310, the determinations and metrics obtained at blocks 304, 306, and 308 may be provided as inputs to one or more machine learning models trained on historical query data, and the model(s) may provide a query performance prediction ("QPP") for the query obtained at block 302. Illustratively, a machine learning model or models may be trained to recognize queries that have resulted in positive user interactions, queries that have resulted in negative or no interactions, queries that have resulted in further queries (e.g., to correct errors in the parsing of the previous query), and so forth. The machine learning models may be trained, for example, using a dataset that associates a relevance score y with individual pairings of a query q and the top search result(s) returned by the query q. The relevance scores y in the training dataset may be determined manually (e.g., by a provider of the networked service, by crowdsourcing user input, etc.), and the machine learning models may then be trained to develop algorithms that fit the training dataset. The trained models may then be used to predict a relevance score for a new query. The QPP may thus represent a prediction as to whether the query, if executed, will result in a positive user interaction.

At decision block 312, a determination may be made as to whether the QPP satisfies a threshold. In some embodiments, the threshold may be a fixed value that is determined based on the QPP scores of previously analyzed queries. In other embodiments, the threshold may be determined based on characteristics of the query or the metadata. For example, shorter queries (i.e., queries with a lower word, phoneme, or character count) may be required to meet a higher threshold than longer queries, or queries for which the speech recognizer or a product recognizer have high confidence may be subjected to a lower threshold. If the determination is that the QPP does not satisfy the threshold, then at block 314 an alternative query may be obtained. Illustratively, an alternative query may be obtained by executing a separate routine, such as the routine 400 described in more detail below with reference to FIG. 4. At block 316, the query or the alternative query may be submitted to a search engine, and at block 318 search results may be processed and returned as described in more detail above.

It will be understood that FIG. 3 is provided for purposes of example, and that many variations on the routine 300 are within the scope of the present disclosure. For example, blocks 304, 306, and 308 may be carried out in any order or in parallel. As a further example, blocks 312, 314, 316, and 318 may be omitted or carried out separately, and the routine 300 may output a query performance prediction without executing the original query or a rewritten query. The depicted routine 300 is thus understood to be illustrative and not limiting.

Figure 4:
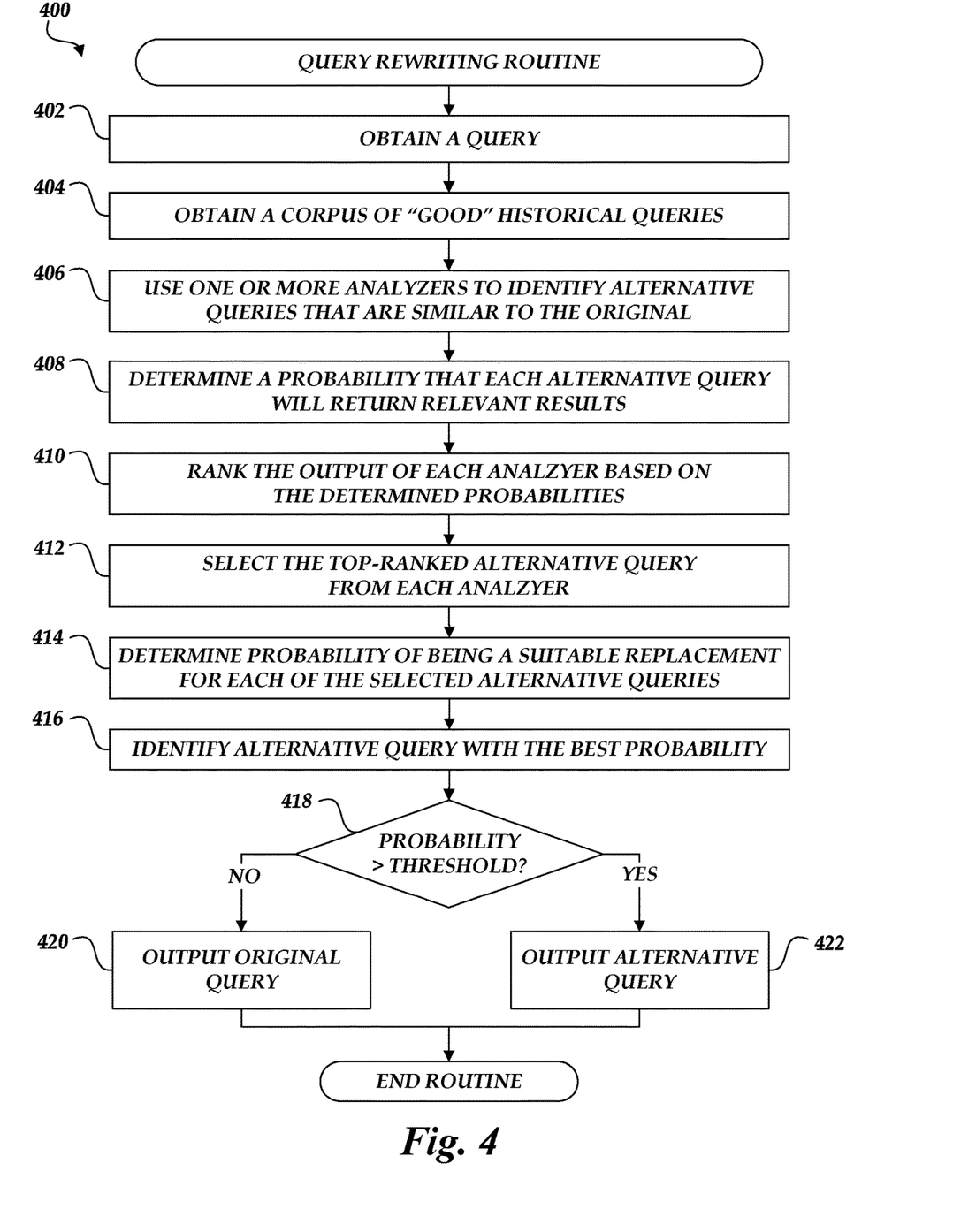
FIG. 4 is a flowchart depicting an illustrative routine for rewriting a query in accordance with aspects of the present disclosure.

FIG. 4 is a flow chart depicting an illustrative routine 400 for rewriting a query in accordance with aspects of the present disclosure. The routine 400 may be carried out, for example, by the user query rewriting module 150 depicted in FIG. 1. The routine 400 begins at block 402, where a query may be obtained. In some embodiments, as discussed above, the query may be one that has been determined to have a low QPP score. In other embodiments, the routine 400 may be carried out independently of determining a QPP score for the original query. For example, the routine 400 may be carried out to identify an alternative query that is executed in parallel to the original query, and the results of both queries may be evaluated or combined to provide a result to the user.

At block 404, a corpus of "good" historical queries may be obtained. As discussed above, in some embodiments, the corpus of "good" historical queries may be maintained by the provider of the networked service, and may include queries that were identified as resulting in a positive user interaction or as having a high probability of resulting in a positive user interaction. In other embodiments, the "good" historical queries may be manually identified from a larger collection of historical queries (e.g., by third-party assessment of whether the query results were relevant to the user input).

At block 406, one or more analyzers may be used to identify alternative queries that are similar to the original query. In various embodiments, as described in more detail above, different analyzers may consider the query as, for example, phonemes, textual words, phonetic words, textual n-grams (a set of n characters), phonetic n-grams, and other ways of parsing the original user input or the processed user input. For example, a textual 4-gram analyzer may analyze each sequence of four characters in the textual representation of the user query (e.g., "mark," "arke," "rked," "kedt," "edtr," etc.) to identify alternative words or phonemes that could be derived from each sequence, and may further analyze the alternate words or phonemes to assess whether a semantically valid sentence can be derived from them. Illustratively, different analyzers may be more or less effective at recovering from different errors in the original voice query. For example, a phonetic analyzer may detect mistakes in converting phonemes to words, while a textual analyzer may detect and mitigate user pronunciation errors. Various analyzers may thus be applied to the original query to produce alternative queries.

In some embodiments, an analyzer may consist of a tokenizer followed by a filter. Illustratively, the tokenizer may split the query into tokens such as words, n-grams, segments between selected separator characters, or according to other criteria. The filter may then process each token. Tokens may be processed by, e.g., converting to lowercase, converting to a phonetic representation, lemmatizing, removing stop words, and so forth. In further embodiments, the corpus of "good" historical queries may be processed by the analyzer and added to an inverted index, and alternative queries may be identified by processing the query with the analyzer and then searching the inverted index for queries that produced similar results when processed with the same analyzer. Similarity may be scored or ranked according to various ranking functions known in the art, such as Okapi BM25, TFIDF, divergence from randomness, divergence from independence, or other ranking functions.

At block 408, a probability may be determined as to whether each of the alternative queries identified at block 406 will return relevant results. In some embodiments, machine learning models that are trained on the output of each analyzer may be used to determine a probability that a given alternative query is a suitable replacement for the original query. The machine learning models may be trained, for example, on previous outputs of the analyzers, which may be assessed as described above as to whether they output alternatives that produced relevant search results. The previous outputs of the analyzer and the manual assessments of whether these outputs are relevant may thus be used to form a training dataset, and the machine learning model may then be trained to produce probabilities that correspond to the manually determined relevance scores of the outputs. It will be understood that an alternative query may be a "good" query, having been identified from a corpus of queries that resulted in positive user interactions in the past, but may or may not be a relevant query, in the sense that it produces search results that are responsive to the user's original query. The probability of relevance determined at block 408 thus differs from the query performance prediction determined by the routine 300. In some embodiments, however, a query performance prediction may be determined for an alternative query or queries using any of the techniques described above, and the QPP score for the alternative query may be provided as an input to the machine learning model.

In some embodiments, analyses of similarities or differences between the original query and an alternate query may be provided as inputs to the machine learning model. For example, textual differences such as a Levenshtein distance between the original query and an alternate query may be determined, either at the word or character level. As further examples, the Levenshtein distance may be determined for a sorted version of a query (e.g., one in which the words are lexicographically sorted), a normalized Levenshtein distance may be determined, or a normalized Levenshtein distance may be determined for a sorted version of the query. As still further examples, a Jaccard similarity, edit distance, phoneme textual similarity, or other textual similarity may be determined and provided as an input to the machine learning model. Additionally, in some embodiments, semantic similarities may be determined. Illustratively, word embedding techniques may be used to map words or phrases in the queries to vectors in a semantic space, and a semantic similarity may be determined as the cosine similarity, Euclidean distance, or other distance function between the average vector of two queries' normalized word embedding vectors. In other embodiments, query features such as product type or brand name may be extracted from each query and compared. In further embodiments, a specialized word embedding may be used that is trained on a corpus of queries that resulted in positive interactions, or that is trained on concatenations of query and product title pairings.

At block 410, the outputs of the machine learning models may be ranked to identify a "best" alternative query (e.g., one most likely to produce relevant search results) from each of the analyzers. Illustratively, a particular analyzer may produce multiple alternative queries (e.g., "books by Mark Twain," "boots buy ark drain," "looks bye mark crane," etc.), and the corresponding machine learning model may be used to determine a relevance score for each of the produced alternative queries. The relevance scores output by the machine learning model may then be ranked to identify the alternative query that is most likely to provide relevant results. At block 412, the top-ranked alternative query from each analyzer may be selected.

At block 414, a probability may be determined for each of the top-ranked alternative queries as to whether that alternative is a suitable replacement for the original query. Illustratively, the outputs of the various machine learning models may be provided as inputs to a second-tier machine learning model, which may be trained on a dataset generated from previous top-ranked alternatives from each analyzer and manual assessments of whether these alternatives were relevant. It will be understood that the "best" alternative query may not necessarily be the query that received the highest ranking from a particular first-tier machine learning model, as the first-tier machine learning models may be more focused at discriminating between the outputs of their respective analyzers than on how their "most relevant" probability score compares to the score output by another first-tier model. The second-tier machine learning model may thus consider these factors when selecting a best alternative query from among the top alternatives produced by the different analyzers. The second-tier machine learning model may therefore output its own probability score as to whether the selected "best" alternative query will produce relevant search results.

At decision block 418, a determination may be made as to whether the probability determined at block 414 satisfies a threshold. If not, then at block 420 the original query may be output for execution by a search engine (e.g., the query engine 156 depicted in FIG. 1). In some embodiments, the routine 400 may output that no better alternative was found, or may output the alternative query with an indication that its probability of being "better" than the original query did not exceed a threshold. In some embodiments, the threshold may be a fixed threshold that screens out unlikely alternatives. In other embodiments, the threshold may be determined as a function of the QPP score of the original query. For example, the original query may have a low QPP score, indicating that the query is expected to return no results or irrelevant results. The threshold for executing an alternative query may thus be lowered, since returning the results of the alternative query is more likely to produce a positive outcome. Additionally, in some embodiments, the determination may be based on rules or models other than the probability determined at block 414. For example, the determination may be that the predicted performance of the alternative query exceeds the predicted performance of the original query by a threshold amount.

If the determination at decision block 418 is that the probability satisfies the threshold, then at block 422 the identified alternative query may be output for execution by the search engine. In some embodiments, the original and alternative queries may be executed in parallel, and a determination of which results to send (or to send a combination of results) may be made upon receipt of the search results. In other embodiments, the routine 400 may carry out execution of the query or queries and provide search results as output.

It will be understood that FIG. 4 is provided for purposes of example, and that many variations on the routine 400 are within the scope of the present disclosure. For example, decision block 418 may be omitted or may be external to the routine 400, and the routine 400 may output the alternative query and the probability identified at block 414. As a further example, alternative queries whose likelihood of returning relevant results exceeds a threshold may be selected from each analyzer at block 412. The depicted routine 400 is thus understood to be illustrative and not limiting.

Figure 5:
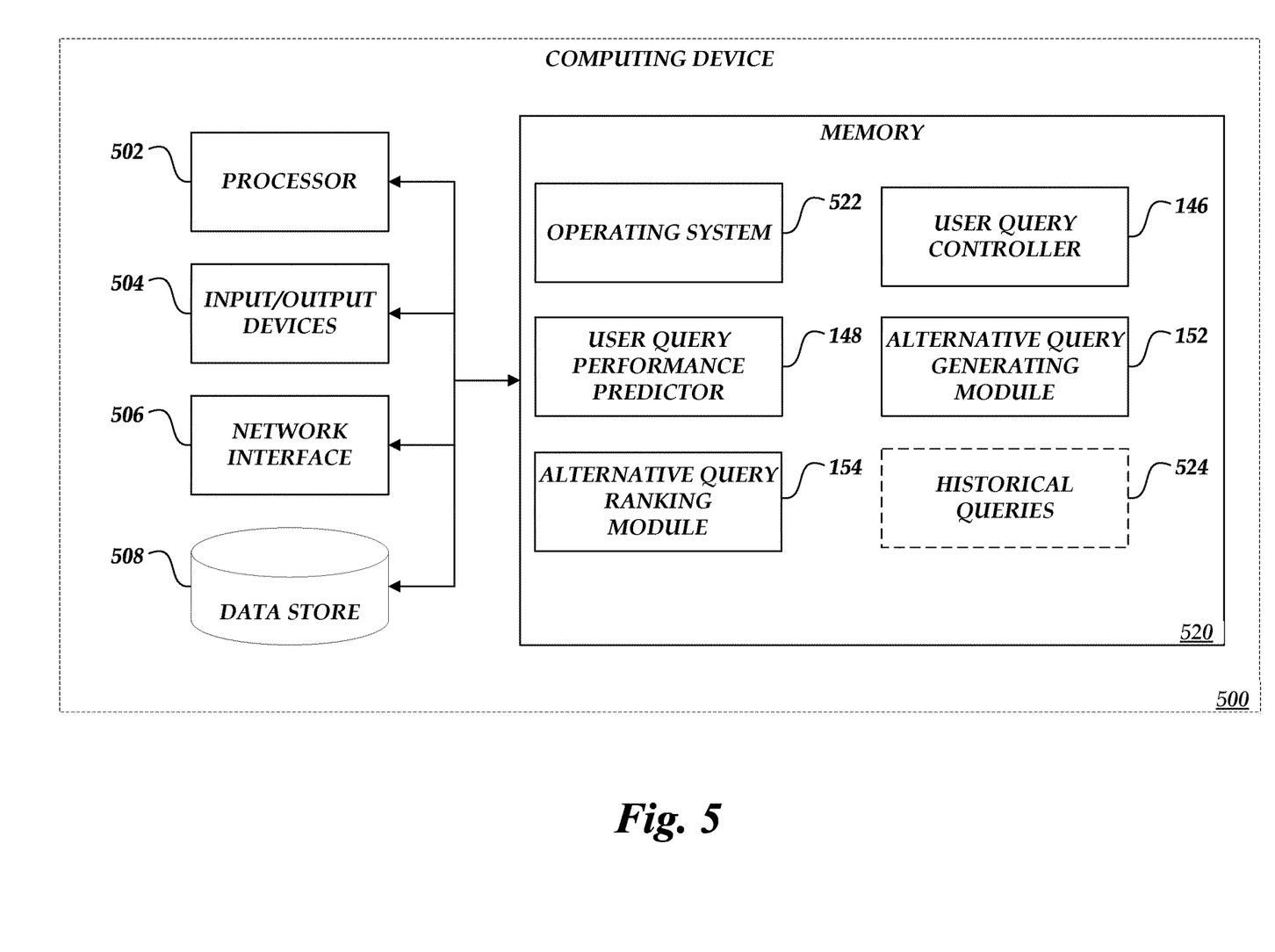
FIG. 5 depicts a general architecture of a computing device implementing a semantic question filtering module in accordance with aspects of the present disclosure.

FIG. 5 depicts a general architecture of a computing device 500 that includes an arrangement of computer hardware and software configured to implement aspects of the present disclosure. The computing device 500 may include many more (or fewer) elements than those shown in FIG. 5. It is not necessary, however, that all of these elements be shown in order to provide an enabling disclosure.

As illustrated, the computing device 500 includes a processor 502, input/output devices 504, a network interface 506, and a data store 508, all of which may communicate with one another by way of a communication bus 510. The network interface 506 may provide connectivity to one or more networks (such as the network 120 depicted in FIG. 1) or computing systems and, as a result, may enable the computing device 500 receive and send information and instructions from and to other computing systems or services, such as the query performance data store 160 depicted in FIG. 1. In some embodiments, the computing device 500 may be configured to process requests from other devices or modules, such as requests to initiate network communications. The data store 508 may illustratively be any non-transitory computer-readable data store, and in some embodiments may include all or part of the query performance data store 160 depicted in FIG. 1.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the computing device 500. The memory 520 may further store specific computer-executable instructions and other information (which may be referred to herein as "modules" or "engines") for implementing aspects of the present disclosure. For example, the memory 520 may include a user query performance predictor 148, an alternative query generating module 152, and an alternative query ranking module 154, which may implement aspects of the present disclosure as described above. The memory 520 may further include historical queries 524, which may be loaded into the memory 520 as various operations are performed.

While the operating system 522, user query performance predictor 148, alternative query generating module 152, and alternative query ranking module 154 are illustrated as distinct modules in the memory 520, in some embodiments, the user query performance predictor 148, alternative query generating module 152, and alternative query ranking module 154 may be incorporated as a module or modules in the operating system 522 or another application or module, and as such, separate modules may not be required to implement some embodiments.

It will be recognized that many of the components described in FIG. 5 are optional and that embodiments of the computing device 500 may or may not combine components. Furthermore, components need not be distinct or discrete. Components may also be reorganized. For example, the computing device 500 may be represented in a single physical device or, alternatively, may be split into multiple physical devices. In some embodiments, components illustrated as part of the computing device 500 may additionally or alternatively be included in other computing devices (such as the networked service 140 of FIG. 1), such that some aspects of the present disclosure may be performed by the computing device 500 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A computer-implemented method comprising:
under control of a computing device configured with specific computer-executable instructions,
receiving a user query derived from processed voice input;
determining a predicted performance of the user query, the predicted performance indicative of a predicted relevance of search results that would be obtained in response to executing the user query;
determining that the predicted performance of the user query does not satisfy a threshold;
obtaining a first analyzer, a first machine learning model, a second analyzer, and a second machine learning model;
applying the first analyzer to the user query to obtain, from a first plurality of alternatives to the user query, a first alternative query;
applying the second analyzer to the user query to obtain, from a second plurality of alternatives to the user query, a second alternative query;
applying the first machine learning model to generate a first probability that the first alternative query is a suitable replacement for the user query;
applying the second machine learning model to generate a second probability that the second alternative query is a suitable replacement for the user query;
determining, based at least in part on a third machine learning model that takes the first probability and the second probability as inputs, a ranking for the first alternative query and the second alternative query;
selecting, based at least in part on the ranking, a rewritten query from among the first alternative query and the second alternative query; and
providing a search result that corresponds to the rewritten query.

2. The computer-implemented method of claim 1, wherein the predicted performance of the user query is determined based at least in part on one or more of a language model, a percentage of conversions associated with previous executions of the user query, a number of conversions associated with previous executions of the user query, a speech recognition confidence level, a user intent confidence level, a product confidence level, a product type confidence level, or a textual property of the user query.

3. The computer-implemented method of claim 1, wherein the user query includes at least one misinterpretation of the processed voice input.

4. The computer-implemented method of claim 1, wherein the user query includes a misidentified product.

5. The computer-implemented method of claim 1, wherein determining to replace the user query with the first alternative query is based at least in part on historical performance of the first and second machine learning models.

6. A system comprising:
a data store configured to store historical query performance data; and
a processor in communication with the data store, wherein the processor is configured with specific computer-executable instructions to perform operations including:
obtaining a user query derived from processed voice input;
determining, based at least in part on the historical query performance data, that a predicted performance of the user query does not satisfy a threshold;
identifying a first plurality of alternatives to the user query;
selecting a first alternative from the first plurality of alternatives based at least in part on a first probability that the first alternative will return a relevant result;
identifying a second plurality of alternatives to the user query;
selecting a second alternative from the second plurality of alternatives based at least in part on a second probability that the second alternative will return a relevant result;
determining, for the first alternative, a first likelihood of being a suitable replacement for the user query,
determining, for the second alternative, a second likelihood of being a suitable replacement for the user query,
determining a ranking for the first alternative and the second alternative based at least in part on the first likelihood and the second likelihood;
selecting, based at least in part on the ranking, a rewritten query from among the first alternative and the second alternative; and
obtaining a query search result corresponding to the rewritten query.

7. The system of claim 6, wherein the first plurality of alternatives to the user query is identified based at least in part on a phonetic analysis of the user query.

8. The system of claim 6, wherein the second plurality of alternatives to the user query is identified based at least in part on a textual analysis of the user query.

9. The system of claim 6, wherein the processor is further configured with computer-executable instructions to perform operations including applying a first machine learning model to each alternative of the first plurality of alternatives to determine a probability that the alternative will return a relevant result.

10. The system of claim 9, wherein selecting the first alternative comprises selecting, from among the first plurality of alternatives, the alternative having the highest probability of returning a relevant result.

11. The system of claim 6, wherein the processor is further configured with computer-executable instructions to perform operations including determining the predicted performance of the user query.

12. The system of claim 6, wherein the processor is further configured with computer-executable instructions to perform operations including obtaining user query search results corresponding to the user query.

13. The system of claim 12, wherein obtaining the rewritten query search results is responsive to a determination that the user query search results are not relevant to the user query.

14. The system of claim 12, wherein the processor is further configured with computer-executable instructions to perform operations including causing at least a portion of the user query search results to be provided in response to the user query.

15. The system of claim 6, wherein the first alternative selected from the first plurality of alternatives is phonetically similar to the user query.

16. The system of claim 6, wherein the user query includes a distinctive word, and wherein the second alternative selected from the second plurality of alternatives includes the distinctive word.

17. The computer-implemented method of claim 1, wherein the first analyzer comprises one or more of a text word analyzer, a phonetic word analyzer, a full phonetic input analyzer, an n-gram analyzer, or a phonetic n-gram analyzer.

18. A non-transitory computer-readable medium including computer-executable instructions that, when executed by a processor, configure the processor to perform operations including:
   determining, based at least in part on historical query performance data, that a predicted performance of a user query does not satisfy a threshold, wherein the user query is derived from processed voice input;
   generating a plurality of alternatives to the user query;
   identifying, from the plurality of alternatives to the user query, a first alternative to the user query based at least in part on a first probability that the first alternative will return a relevant result;
   identifying, from the plurality of alternatives to the user query, a second alternative to the user query based at least in part on a second probability that the second alternative will return a relevant result;
   selecting, based at least in part on a ranking of the first probability and the second probability, a rewritten query from among the first alternative and the second alternative; and
   obtaining at least one search result associated with the rewritten query.

19. The non-transitory computer-readable medium of claim 18, further including computer-executable instructions that, when executed by the processor, configure the processor to perform operations including determining the predicted performance of the user query based at least in part on historical query performance data.

20. The non-transitory computer-readable medium of claim 19, wherein determining the predicted performance comprises one or more of: determining a probability that the user query linguistically resembles a successful query, determining a percentage of time that previous executions of the user query have resulted in a conversion, or obtaining a confidence score representing a likelihood that a speech recognizer has correctly derived the user query from audio input.

21. The non-transitory computer-readable medium of claim 18, wherein the plurality of alternatives to the user query is a first plurality of alternatives to the user query, and wherein the non-transitory computer-readable medium further includes computer-executable instructions that, when executed by the processor, configure the processor to perform operations including:
   generating a second plurality of alternatives to the user query; and
   identifying, from the second plurality of alternatives to the user query, a second alternative to the user query based at least in part on a second probability that the second alternative will return a relevant result,
   wherein selecting the rewritten query is based at least in part on ranking the second alternative.

22. The non-transitory computer-readable medium of claim 21, wherein at least one of the first plurality of alternatives or the second plurality of alternatives is identified from a plurality of historical queries.

23. The non-transitory computer-readable medium of claim 18, wherein the first alternative is identified from the plurality of alternatives based at least in part on a machine learning model that is trained to evaluate outputs of a first analyzer.

24. The non-transitory computer-readable medium of claim 18, further including computer-executable instructions that, when executed by the processor, configure the processor to perform operations including determining that a predicted performance of the rewritten query satisfies a threshold.

25. The non-transitory computer-readable medium of claim 18, further including computer-executable instructions that, when executed by the processor, configure the processor to perform operations including determining that a predicted performance of the rewritten query is better than a predicted performance of the original query.

* * * * *